(12) United States Patent
Kaoru

(10) Patent No.: US 7,683,786 B2
(45) Date of Patent: Mar. 23, 2010

(54) ARTICLE CASE WITH RFID TAG AND RFID SYSTEM

(75) Inventor: Fukuda Kaoru, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/867,252

(22) Filed: Oct. 4, 2007

(65) Prior Publication Data

US 2008/0094222 A1 Apr. 24, 2008

(30) Foreign Application Priority Data

Oct. 23, 2006 (JP) ............................. 2006-287451

(51) Int. Cl.
G08B 13/14 (2006.01)
(52) U.S. Cl. ................. 340/572.1; 340/572.7
(58) Field of Classification Search ............. 340/572.1, 340/572.7
See application file for complete search history.

(56) References Cited

U.S. PATENT DOCUMENTS

| 2003/0121686 | A1* | 7/2003 | Barabash | .................. | 174/35 R |
| 2003/0214774 | A1* | 11/2003 | Locatelli et al. | ............. | 361/118 |
| 2004/0126084 | A1* | 7/2004 | Kojima | ......................... | 386/46 |
| 2006/0038683 | A1* | 2/2006 | Claessens et al. | ........ | 340/572.1 |
| 2006/0132312 | A1* | 6/2006 | Tavormina | ............... | 340/572.7 |
| 2006/0220875 | A1* | 10/2006 | Campero et al. | ......... | 340/572.7 |
| 2007/0001809 | A1* | 1/2007 | Kodukula et al. | .......... | 340/10.1 |
| 2007/0075911 | A1* | 4/2007 | Yaginuma et al. | ........... | 343/853 |
| 2007/0096879 | A1* | 5/2007 | Mori | ......................... | 340/10.5 |
| 2007/0188306 | A1* | 8/2007 | Tethrake et al. | .......... | 340/10.51 |

FOREIGN PATENT DOCUMENTS

| JP | 08-263610 | 10/1996 |
| JP | 2000-137873 | 5/2000 |
| JP | 2001-026308 | 1/2001 |
| JP | 2001253517 | 9/2001 |
| JP | 2001328713 | 11/2001 |
| JP | 2003069447 | 3/2003 |
| JP | 2005031924 | 2/2005 |
| JP | 2005135354 | 5/2005 |
| JP | 2005141388 | 6/2005 |
| JP | 2005165427 | 6/2005 |
| JP | 2005-190216 | 7/2005 |
| JP | 2006013934 | 1/2006 |
| JP | 2006-039967 | 2/2006 |
| JP | 2006029967 | 2/2006 |
| JP | 2006240868 | 9/2006 |
| JP | 2006246372 | 9/2006 |

* cited by examiner

Primary Examiner—Daniel Wu
Assistant Examiner—John F Mortell
(74) Attorney, Agent, or Firm—Hoffman, Warnick & D'Alessandro LLC

(57) ABSTRACT

The present invention is directed to an article case for accessing information on an RFID tag attached to an article enclosed in the case, and an RFID system using the case. An article case in accordance with an embodiment includes: a built-in antenna communicating with the RFID tag attached to the article; and a communication structure connected to the built-in antenna and disposed on an outer surface of the case, for communicating with an external RFID reader/writer.

13 Claims, 9 Drawing Sheets

FIG. 3
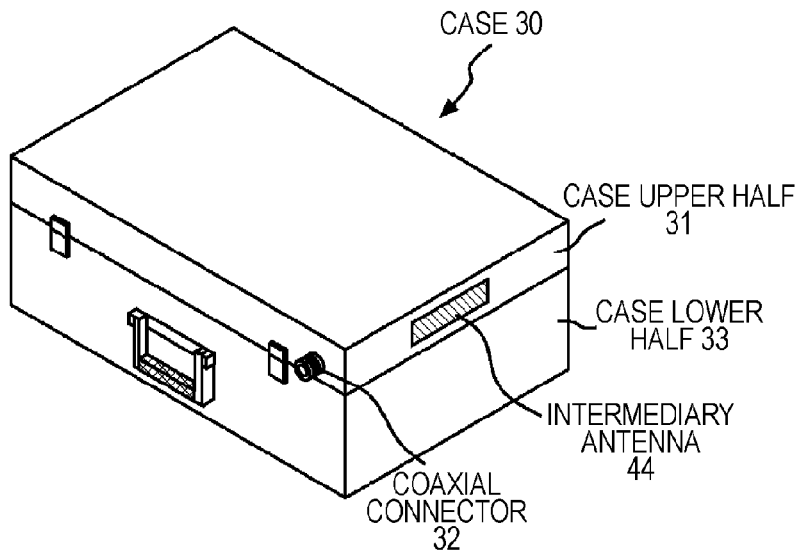
(a)
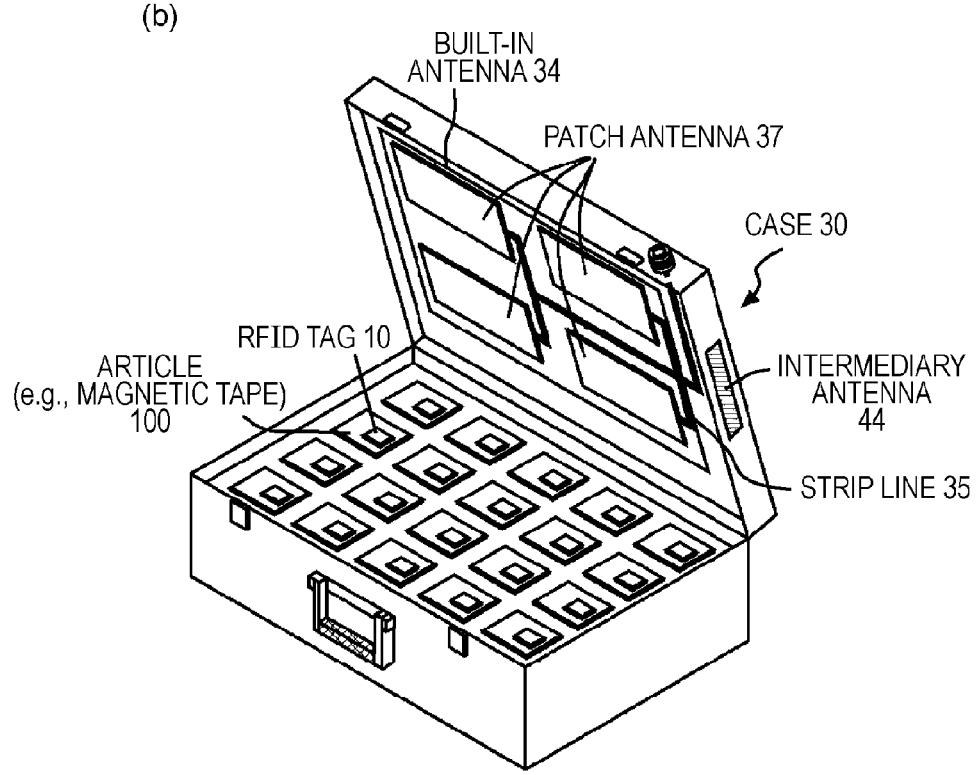
(b)

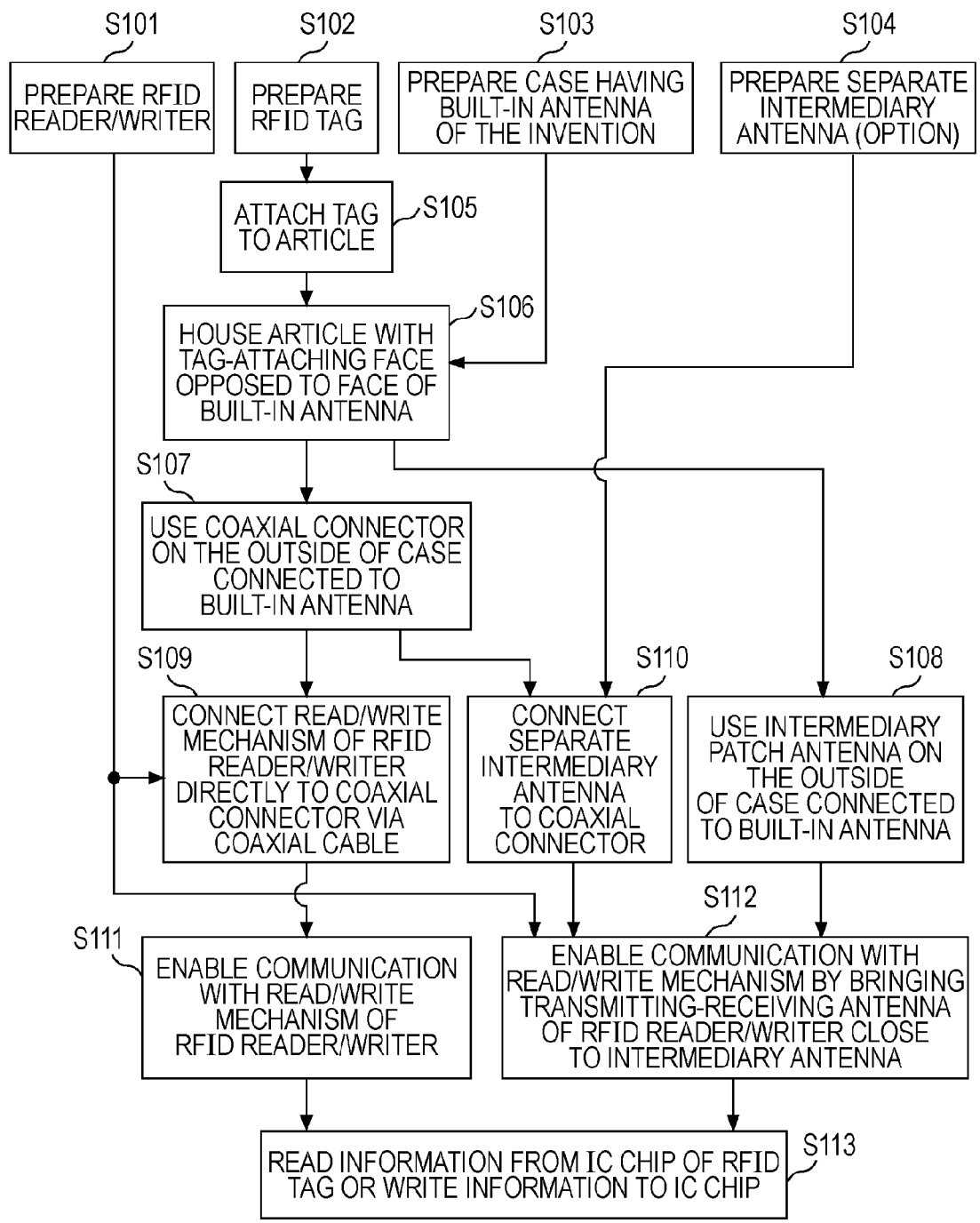

ARTICLE CASE WITH RFID TAG AND RFID SYSTEM

BACKGROUND OF THE INVENTION

1. Field of the Invention

The present invention relates to a case for enclosing articles with an RFID tag and an RFID system using the case, and more specifically, the present relates to a high-safety case and an RFID system in which information of the articles in the case can be read from or written to the RFID tags attached to the articles.

2. Related Art

Methods for reading and writing from/to a radio frequency identification tag (an RFID tag) include inductive coupling and electromagnetic coupling, which use electromagnetic induction by a magnetic field and radio waves of antennas, respectively. Both methods employ non-contact communication with an RFID reader/writer (or an IC tag scanner).

An RFID tag includes an antenna and an IC chip. When the antenna receives electric power and a signal from the RFID reader/writer, the controller of the IC chip accumulates the received electric power in a capacitor, and sends information stored in the storage section of the IC chip again from the antenna to the RFID reader/writer using the electric power.

Electromagnetic waves propagate with alternating electric and magnetic fields at a phase of 90 degrees. To this extent, when alternating magnetic flux due to magnetic change crosses a conductor including metal such as iron, aluminum, or copper, an eddy current is induced in the conductor, which generates magnetic flux in a direction that cancels the alternating magnetic field. Thus, such RFID tags, when metal is present in the front, back, or periphery, have the problem that information from the RFID tags cannot be correctly read because magnetic fields and radio waves are reflected or absorbed by the metal. Therefore, no metallic material is generally disposed between RFID tags and reader/writers.

To protect articles with RFID tags from external stress or shock during storage, transportation, or usage, one or a plurality of articles are often covered with a case. In this case, to carry out a communication between an RFID reader/writer and an RFID tag from the exterior of the case, metal cannot be used as the material of the case because it is an obstacle to communication. Therefore, articles with RFID tags are housed in cases made of a nonconductive material such as plastic.

Furthermore, when important information such as magnetic tape is housed in a package that carries an IC tag and is managed by an RFID system, a solid case made of metal such as duralumin is generally used to transport magnetic tapes in one go. In this case, no electromagnetic waves pass through the case because it is made of metal. Accordingly, to read the information from the IC tags attached to the articles in the case or to write new information thereto, the user must open the case to read the information with an RFID reader/writer.

Japanese Unexamined Patent Application Publication No. 2000-137873 discloses a system in which the entire RFID system, including articles with ID tags, an RFID reader/writer, a transmitting-receiving antenna, and a power circuit, is housed in a metal case, and in which ID information is read by a reader in the metal case without opening the cover of the metal case, and thereafter, the information is transmitted to another device via an external connector connected to a connector on the outer surface of the metal case. The communication using radio frequency (RF) by the RFID system is completely closed in the metal case. This is not suitable for transportation because of the heavy metal case including the reader, the power supply unit and other components.

Japanese Unexamined Patent Application Publication No. 2001-26308 discloses a system in which transmitting antennas and receiving antennas (coils) are disposed on the sides (six faces) of a returnable box, and when the returnable box passes by a sensor box (which also has transmitting antennas and receiving antennas), each face is made valid in sequence so that information of the ID tags in the returnable box can be read. This arrangement allows information to be sensed irrespective of the arrangement of the articles with ID tags in the box, that is, this arrangement prevents the directional characteristics of the ID tags. However, this arrangement needs to provide antennas on all the sides of the returnable box and requires such a complicated operation as to switch the antennas and as such, the returnable box would become complicated in structure, and have an increased weight.

When managing valuables such as magnetic storage media (e.g., tape, disks, etc.) containing customer information, noble metals, jewels, etc., using an RFID system, solid metal cases made of duralumin or the like are generally used for transportation. In this case, to read identification information (ID) of RFID tags, it is necessary to open every case and bring an RFID reader/writer to articles, resulting in low work efficiency. Moreover, for security or safe management, it would be an important challenge to read the information of ID tags attached to valuables without opening the metal transportation case.

SUMMARY OF THE INVENTION

The present invention provides a solid (or hard) and highly portable case, made of metal or a material through which is difficult to transmit an electromagnetic wave, for enclosing an article having an RFID tag which can be used in an RFID system. Further, the present invention provides a high-safety case that is shielded by a metal plate or the like and that can communicate with IC tags in the case from the exterior without opening the case.

The present invention further provides an RFID system for accessing, that is, writing information to or reading information from, articles with RFID tags housed in a case made of a metal-containing material that transmits little or no electromagnetic waves, thus managing information of the articles.

The present invention also provides a method for managing information of articles with RFID tags housed in a case made of a metal-containing material that transmits little or no electromagnetic waves.

An article case for accessing information on an RFID tag attached to an article enclosed in the case in accordance with an aspect of the invention includes: a built-in antenna communicating with the RFID tag attached to the article; and a communication structure connected to the built-in antenna and disposed on an outer surface of the case, for communicating with an external RFID reader/writer.

The communication structure includes an external coaxial connector, an intermediary transmitting-receiving antenna, or a combination thereof. In a form, the case is made of metal, which can be applied to a portable case. Here "disposed on the outer surface" includes being embedded in the case and indicates that a communication structure is formed on the surface (including the upper surface, the lower surface, or a side). The communication structure can be covered with a cover that can transmit electromagnetic waves with a frequency for communication as necessary. Note that the "case" is not limited to a general portable rectangular case but also any shape and size of openable boxes and bags including large-size boxes for use in the distribution industry, such as large-size housings or containers.

The built-in antenna can be opposed to (or face) an antenna of an RFID tag attached to the article, and can be mounted to the inner surface of the case. The built-in antenna can include at least one patch antenna. A plurality of patch antennas can be formed on the surface of a printed circuit board. To this extent, a grounding conductor face can be formed on the back of the printed circuit board, and the plurality of patch antennas can be connected together with a strip line or a coaxial (cable) line. In a form, the built-in antenna serves as an antenna of the RFID reader/writer that can read an RFID tag. Here "mounted to the inner surface" includes being embedded in the case. The built-in antenna can be covered with a cover with electromagnetic-wave transmittance (permeability) as necessary.

The built-in antenna can be directly mounted to the inner surface of a metal case via an insulator. The outer frame of the metal case constitutes a grounding conductor face of the patch antenna. The article case can further include an internal coaxial connector connected to the built-in antenna, wherein the internal coaxial connector and the external coaxial connector or the intermediary transmitting-receiving antenna are connected together via a coaxial cable. The intermediary transmitting-receiving antenna can be a patch antenna.

An RFID system according to an aspect of the invention comprises: at least one article case for accessing information on an RFID tag attached to an article enclosed in the case, the case comprising a built-in antenna communicating with the RFID tag attached to the article and a communication structure connected to the built-in antenna and disposed on an outer surface of the case; and an RFID reader/writer comprising a read/write mechanism and a transmitting-receiving antenna, the RFID reader/writer being connected to the communication structure to access the RFID tag.

When the read/write mechanism of the RFID reader/writer is directly connected to the communication structure, there is no need for the transmitting-receiving antenna of the RFID reader/writer. The communication structure includes an external coaxial connector, an intermediary transmitting-receiving antenna, or a combination thereof.

In another embodiment, the RFID system further include an intermediary transmitting-receiving antenna separate from the case, the intermediary transmitting-receiving antenna being connected to the external coaxial connector, and an RFID reader/writer including a transmitting-receiving antenna for communicating with the intermediary transmitting-receiving antenna. The intermediary transmitting-receiving antenna separate from the case can be one of a patch antenna, a horn antenna, and a parabolic antenna.

The RFID system of the invention can further include a storage unit in which article information is stored; and a computer connected between the storage unit and the RFID reader/writer, for processing the article information.

A method for managing an article according to an aspect of the present invention comprises: obtaining a case, the case including a built-in antenna for communicating with an RFID tag attached to an article enclosed within the case, with an external coaxial connector or an intermediary patch antenna connected to the built-in antenna and disposed on an outer surface of the case; disposing the article in the case such that a face of the article to which the RFID tag is attached is opposed to an antenna face of the built-in antenna; obtaining an RFID reader/writer for accessing the RFID tag; connecting the RFID reader/writer to the external coaxial connector of the case with a coaxial cable or bringing an antenna of the RFID reader/writer close to the intermediary patch antenna, with the antenna of the RFID reader/writer opposed to the intermediary patch antenna, thereby enabling communication; and causing the built-in antenna to generate radio waves via the coaxial cable or the intermediary patch antenna to resonate an antenna of the RFID tag with the radio waves such that the RFID reader/writer accesses the RFID tag attached to the article. The method further includes connecting an intermediary antenna separate from the case to the external coaxial connector, thereby enabling communication.

A case according to the invention is lightweight and has high portability because it contains only a transmitting-receiving antenna and RFID tags and has no RFID reader/writer and no power supply. Moreover, the "case" includes not only portable cases but also any shape and size of boxes and bags including large-size boxes for use in the distribution industry, such as large-size housings or containers. This invention is particularly suitable for hard metal cases for magnetic tape or other valuables with RFID tags. It is suitable not only for metal cases but also for cases with low electromagnetic-wave transmittance because of the material or thickness of thereof. The invention is characterized in that a metal case with low electromagnetic-wave transmittance directly receives electric power from the exterior via a cable or radio wave, and applies radio-frequency energy to the built-in transmitting-receiving antenna in the case by coupling electric and magnetic fields for communication with the RFID tags.

The above and other features of the present invention will be apparent from the following detailed description of the embodiments in conjunction with the accompanying drawings. However, it is intended that the drawings shall be interpreted as illustrated and not in a limiting sense.

BRIEF DESCRIPTION OF THE DRAWINGS

FIG. 2 schematically shows the communication between an article case and an RFID reader/writer of the invention, wherein FIG. 2(a) shows a direct connection of a built-in antenna with a coaxial cable; and FIG. 2(b) shows communication via an intermediary antenna.

FIG. 3 shows an article case according to an embodiment of the invention, wherein FIG. 3(a) is a perspective view thereof; and FIG. 3(b) is a diagram showing the case in an open state.

FIG. 4 shows an RFID system of the invention, wherein FIG. 4(a) shows communication via a coaxial cable; FIG. 4(b) shows communication via an intermediary antenna; FIG. 4(c) shows communication via an intermediary antenna attached to a case; and FIG. 4(d) shows an example in which the RFID reader/writer has a transmitting antenna and a receiving antenna separate from each other.

FIG. 6 shows examples of connection between the built-in antenna and the coaxial connector of the article case of the invention, wherein FIG. 6(a) shows a connection in which a metal case constitutes a conductor face of a patch antenna, to which a coaxial connector is connected at right angles; FIG. 6(b) shows a connection in which patch antennas are formed on a double-sided printed circuit board, to which a coaxial connector is connected at right angles; FIG. 6(c) shows a connection in which a metal case constitutes a conductor face of a patch antenna and the patch antenna is connected to an external coaxial connector parallel to the antenna face via an internal coaxial connector; and FIG. 6(d) shows a connection in which patch antennas are formed on a double-sided printed circuit board and are connected to an external coaxial connector parallel to the antenna face via an internal coaxial connector.

FIG. 7 shows internal patch antennas according to an embodiment of the invention, wherein FIG. 7(a) is a perspective view thereof; and FIG. 7(b) is a cross-sectional view thereof.

FIG. 9 is a flowchart of a method for managing articles with the RFID system of the invention.

The present invention will be specifically described with reference to the drawings.

DETAILED DESCRIPTION OF THE INVENTION

Figure 1:
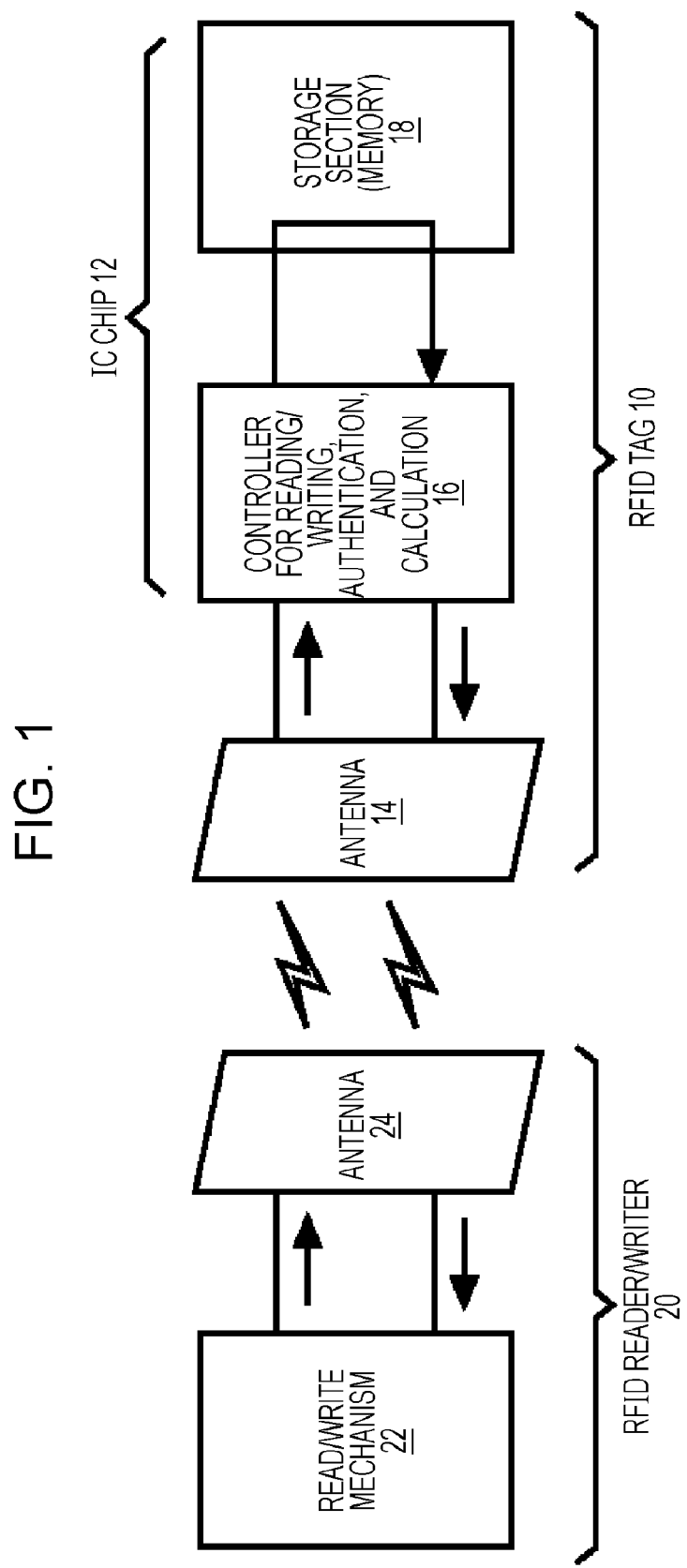
FIG. 1 is a conceptual diagram of an example of a system configuration (electromagnetic coupling type) of an RFID tag and an RFID reader/writer.

FIG. 1 is a schematic block diagram of a system including an RFID reader/writer 20 that accesses an RFID tag 10 and the information of the RFID tag 10 used in the invention. This system is generally referred to as an electromagnetic coupling type, in which signals are transferred by the resonance of antennas. Radio frequencies used in this system are around 2.45 GHz and 950 MHz (UHF band), which normally provide communication ranges of about one meter and three meters, respectively, thus providing wide applications. The system of the electromagnetic coupling type will be described hereinbelow by way of example. RFID tags designed to the respective frequencies are selected. The RFID reader/writer 20 is generally also referred to as a reader or a scanner, which can be applied both to reading and writing of the information in the IC chips of RFID tags. The reading and writing are hereinafter referred to as "access".

The RFID tag 10 has the function of changing radio energy from the RFID reader/writer 20 to electric power, and includes an IC chip 12 having a storage section 18 for storing article information (e.g., an article identification number, a product number, a price, etc.) and a controller 16 for such as reading or writing, authentication, and encryption and an antenna 14 connected to the IC chip 12. The shape and length of the antenna 14 are adjusted to the frequency of the radio wave output from an antenna 24 of the RFID reader/writer 20 so as to receive electricity and data signals through the radio wave.

Communication from the RFID tag 10 to the RFID reader/writer 20 is made in such a way that the antenna 14 of the RFID tag 10 resonates with the radio wave that the antenna 14 has received to generate an electric current, by which the IC chip 12 is driven to send back information in the storage section 18 in the IC chip 12 from the antenna 14. Furthermore, a radio wave that carries the processed-data signal of the controller 16 is generated in the antenna 14. On the other hand, as shown in FIG. 1, the RFID reader/writer 20 generally includes a read/write mechanism 22 serving as a controller and the antenna 24 connected to the read/write mechanism 22. The read/write mechanism 22 includes a power supply and an RF circuit, and can also include any other components, circuits, or devices that are generally used in an RFID reader/writer, such as a communication control circuit, an external interface circuit, an encryption circuit, and memory. Since the read/write mechanism is well known by those skilled in the art, a detailed description thereof will be omitted here. The antenna 24 of the RFID reader/writer 20 has a shape optimized to the frequency of the radio wave for use in outputting radio waves to supply power to the RFID tag 10. Although examples of the RFID reader/writer include a handy type, a stationary type, and a gate type, the invention is not limited to those types.

While the invention will be described here using the electromagnetic coupling type as shown in FIG. 1, the invention is not limited to this type of coupling. Note that the invention can also be applied to a system that uses a loop antenna of an inductive coupling type (with a frequency of 13.56 MHz) (via a matching circuit, as necessary).

Figure 2:
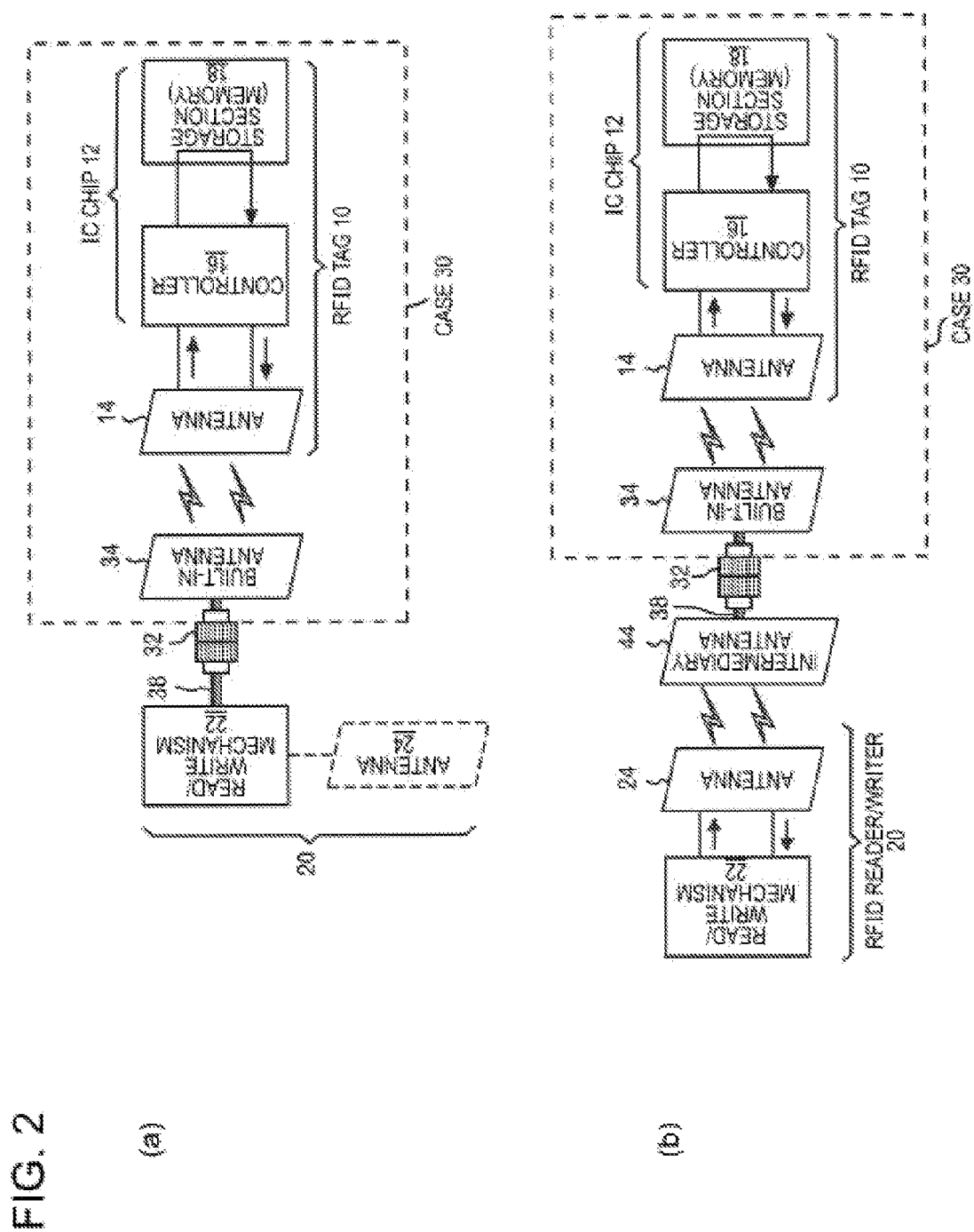

FIG. 2 schematically shows two embodiments of the communication between the article case and the RFID reader according to the invention. An article case 30 according to the invention, which can be used as a portable transportation case, is a case in which information on the articles housed therein can be accessed without opening.

FIG. 2(a) shows an embodiment, which includes a built-in antenna 34 for communicating with the RFID tag 10 attached to an article and an external coaxial connector 32 connected to the built-in antenna 34. FIG. 2(a) shows a structural example (a reader/writer direct connection type) in which the read/write mechanism 22 of the RFID reader/writer 20 is directly connected to the external coaxial connector 32 with an input/output cable (a coaxial cable 38) of the RFID reader/writer 20 and a connector (a 50-ohm coaxial cable or a coaxial connector). The antenna element (antenna face) of the built-in antenna 34 is directed to the interior of the case 30 so as to face the RFID tag 10 attached to the article. In this case, the transmitting-receiving antenna of the RFID reader/writer 20 can also be used as a built-in antenna. In this structural example, the function of the antenna 24 of the RFID reader/writer 20 is provided to the built-in antenna 34 in the case 30, and the RFID reader/writer 20 transfers the power and the data signal from the read/write mechanism 22 serving as the controller to the built-in antenna 34 via the coaxial cable 38 and the coaxial connector 32, and the radio wave is radiated from the built-in antenna 34 to the antenna 14 of the RFID tag 10, thereby enabling communication. The RFID reader/writer 20 can further include the transmitting-receiving antenna 24. The read/write mechanism 22 can further include an edge server having a personal computer function. The RFID tag 10 generally includes the IC chip 12 having the storage section 18 for storing article information and the controller 16 for such as reading/writing and authentication and the antenna 14 connected to the IC chip 12. The external coaxial connector 32 is attached to the outer side of the case 30 so that multiple cases 30 can be stacked.

The power supply (from the RFID reader/writer) and reading/writing of data between the RFID tag and the built-in antenna, between the coaxial connector connected to the built-in antenna or the intermediary antenna connected to the built-in antenna and the RFID reader/writer are herein broadly referred to as "communication".

FIG. 2(b) shows another embodiment. This is a structural example (an indirect reader/writer connection type) in which a communication with the antenna 24 of the RFID reader/writer 20 is made via the built-in antenna 34 that communicates with the RFID tag 10 attached to an article and an intermediary antenna 44 connected to the built-in antenna 34. In this structural example, the radio wave from the transmitting-receiving antenna 24 of the RFID reader/writer 20 shown in FIG. 1 is received by the intermediary antenna 44, and then transferred from the intermediary antenna 44 to the built-in antenna 34 and radiated toward the antenna 14 of the RFID tag 10. FIG. 2(b) shows a system in which the intermediary antenna 44 is connected to the built-in antenna 34 via the coaxial cable 38 and the coaxial connector 32. Alternatively, the intermediary antenna 44 can be directly connected to the built-in antenna 34.

The intermediary antenna 44 is disposed on the outer side of the case 30 in the form of a plane antenna such as a patch antenna, in which multiple cases can be stacked. In the case of an intermediary patch (plane) antenna, it can be connected to the built-in antenna 34 via an internal coaxial connector and a coaxial cable disposed in the case, which are directly connected to the built-in antenna 34. Furthermore, a metal case has the advantage that an antenna face of the patch antenna and a grounding conductor face (grounding conductor or grounding face) opposite thereto with an insulator therebetween can be substituted by the outer frame of the metal case (refer to FIG. 6).

Furthermore, since the intermediary antenna 44 separate from the case 30 is connected to the external coaxial connector 32, communication can be made by the structure of FIG. 2(b). The separate intermediary antenna 44 is not necessarily the patch antenna but can be a parabolic antenna or a horn antenna. For RFID tags of the inductive coupling type, the built-in antenna 34 and the intermediary antenna 44 can be loop antennas (also referred to as an antenna coil).

FIG. 3 shows an article case according to the invention. FIG. 3(a) is a schematic diagram of the case 30. There is the external coaxial connector 32, which is a communication structure, on the outer surface of the case 30. FIG. 3(b) is a perspective view of the case 30 in an open state. A plurality of articles 100 (e.g., magnetic tape) each having an RFID tag is housed in the case lower half 33 of the case 30. The built-in antenna 34 including planar patch antennas 37 is disposed on the inner surface of a case upper half 31 in such a manner as to face the antennas 14 (not shown) of the RFID tags 10. Here, "disposed on the outer surface or on the inner surface" includes being embedded in the case. The patch antennas generally include an antenna element on the insulator of a printed circuit board, a coaxial connector connected to the antenna elements, and a conductor face (grounding conductor face) underlying the insulator. The patch antenna will be specifically described with reference to FIG. 7. A plurality of (four in this case) patch antennas 37 are opposed to the antennas 14 (not shown) of the RFID tags 10 and transmit and receive radio waves. The plurality of patch antennas 37 are generally formed in copper pattern on a printed circuit board. The patch antennas 37 are connected together with a strip line (generally also referred to as a microstrip line) 35. The strip line 35 is connected to the coaxial connector 32 on the outer surface of the case 30 therethrough. The insulator and the conductor surface are not shown in FIG. 3.

This arrangement allows the built-in antenna 34 to have the function of the antenna 24 of the RFID reader/writer 20 (see FIG. 1), allowing accessing internal article information without opening the case 30 by directly connecting the read/write mechanism (controller) 22 of the RFID reader/writer 20 to the coaxial connector 32 via the coaxial cable. Although the embodiment uses the patch antennas, the transmitting-receiving antenna 24 of the RFID reader/writer 20 can be disposed in the case 30 so as to function as the built-in antenna 34. Although the built-in antenna 34 can be disposed on the inner surface of the case 30, it can be disposed in an appropriate position in the case facing the RFID tag if communicable.

It is also possible to provide a wire (not shown) connected to the built-in antenna 34 and to provide planer or patch antennas on the outer surface of the case 30 as an intermediary (plane) antenna 44. In this case, since communication with the antenna 24 of the RFID reader/writer 20 can be made via the intermediary antenna 44, no coaxial connector 32 is needed. However, both the coaxial connector 32 and the intermediary antenna 44 can be provided. When the external coaxial connector 32 and the intermediary antenna 44 are provided to the case 30, as shown in FIG. 3, direct communication with the RFID reader/writer 20 via the coaxial connector 32 and communication with the RFID reader/writer 20 via the intermediary antenna 44 can be made, so that various article cases for various applications and use environments can be achieved. Furthermore, it is also possible to use an internal coaxial connector and a coaxial cable connected to the built-in antenna 34 to connect the built-in antenna 34 to the intermediary plane antenna on the outer surface of the case 30. Moreover, since the external coaxial connector 32 or the intermediary antenna 44 is disposed on the outer surface of the case 30, multiple cases 30 can be stacked. The coaxial connector 32 and the intermediary patch antenna 44 can be disposed on the same side.

Figure 4:
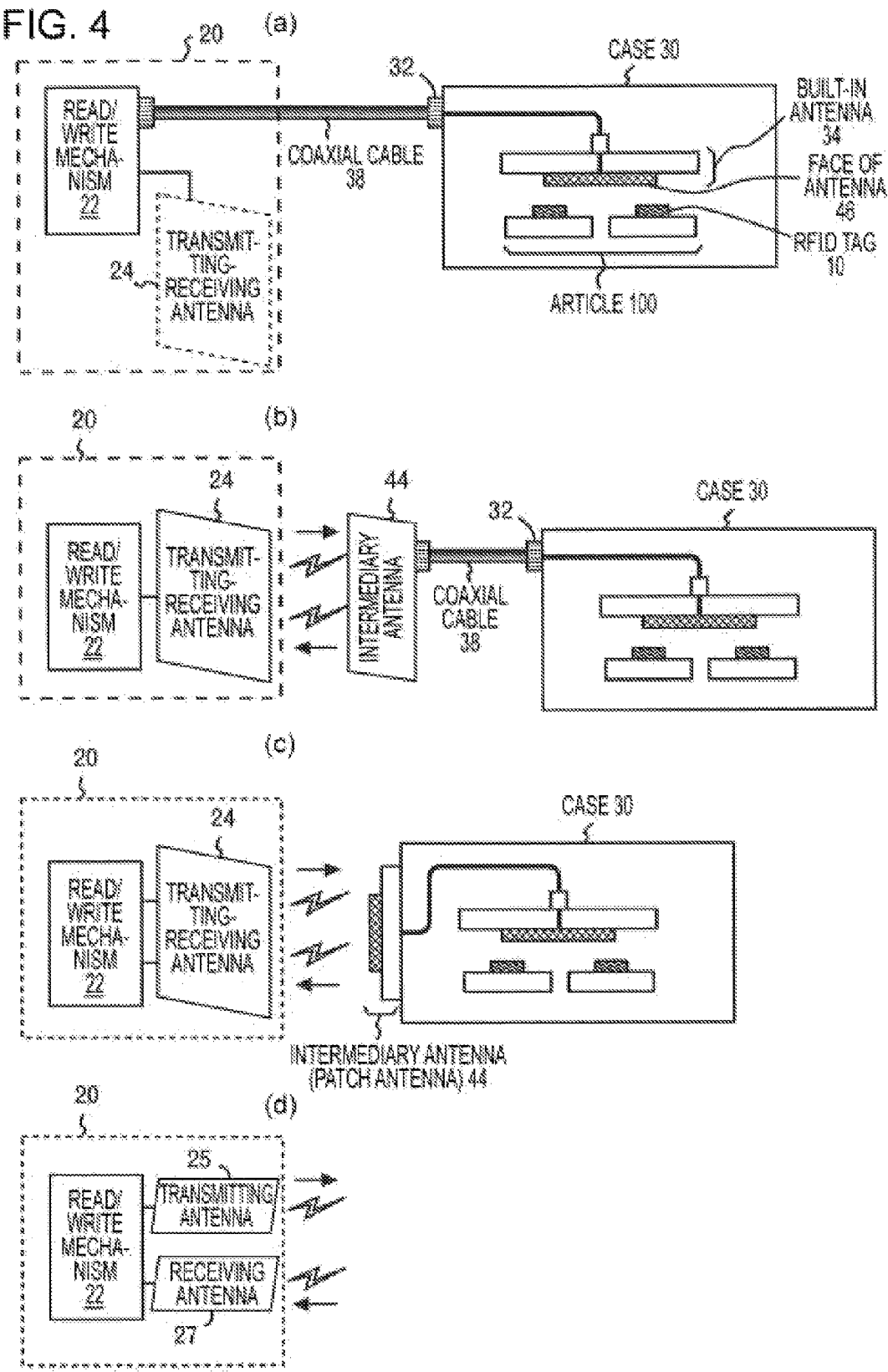

FIG. 4 shows embodiments of an RFID system in which article information of the RFID tags 10 in the case 30 can be accessed without opening the article case 30 (see FIG. 3, for example) according to the invention. FIG. 4(a) shows a structural example in which the antenna face 46 of the built-in antenna 34 (plane antenna) in the case 30 is opposed to the antennas 14 (not shown) of the RFID tags 10 on the articles 100. The coaxial connector 32 connected to the built-in antenna 34 is disposed on the outer surface of the case 30. To the coaxial connector 32, the read/write mechanism 22 which is the controller of the RFID reader/writer 20 is connected via the coaxial cable 38, thereby allowing an access to the RFID tags 10 in the case 30. In this embodiment, the built-in antenna 34 serves as the transmitting-receiving antenna of the read/write mechanism 22. In other words, the transmitting-receiving antenna can be provided even if the RFID reader/writer 20 does not necessarily have the transmitting-receiving antenna 24. FIG. 4(b) shows a structural example using the same case 30 as in FIG. 4(a), in which the intermediary antenna 44 separate from the case 30 is connected to the coaxial connector 32 with the coaxial cable 38, and communication with the transmitting-receiving antenna 24 of the RFID reader/writer 20 is made via the intermediary antenna 44. The intermediary antenna 44 can be of any shape, provided that it can transmit/receive with a frequency band (around 2.45 GHz and 950 MHz) for the RFID system, such as a patch antenna, a parabolic antenna, or a horn antenna. For RFID of the inductive coupling type, a loop antenna is possible.

FIG. 4(c) shows a structural example in which the intermediary antenna 44 of FIG. 4(b) is disposed on the outer surface of the case 30. In this case, an intermediary antenna separate from the case 30 is not necessary; instead, a patch antenna (plane antenna) is used to improve the portability of the case 30. The intermediary antenna 44 is generally a transmitting-receiving antenna, which is connected to the built-in antenna 34. When the RFID reader/writer 20 and the intermediary antenna 44 are disposed close to each other for communication in the arrangements of FIG. 4(b) and FIG. 4(c), either the RFID reader/writer 20 can be brought close to the intermediary antenna 44 on the case 30 or the RFID reader/writer 20 is fixed, to which the case 30 can be brought close by a carrier system or the like.

FIG. 4(d) shows a structure in which the antenna of the RFID reader/writer 20 is divided into a transmitting antenna 25 and a receiving antenna 27. In this case, only the transmitting antenna 25 can be brought close to the intermediary antenna 44 so as to improve communication sensibility. The case 30 can have both or either of the coaxial connector 32 and the plane patch antenna serving as the intermediary antenna 44. The plurality of the cases 30 can be stacked.

Figure 5:
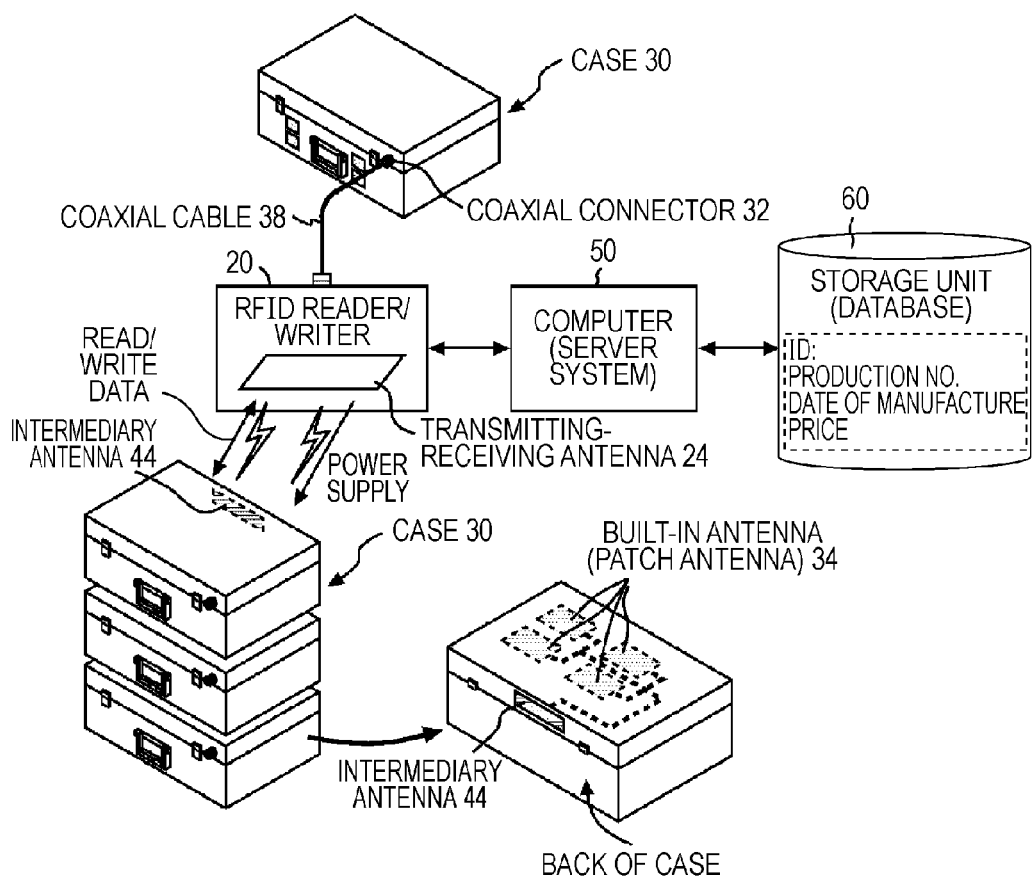
FIG. 5 is a schematic diagram of an RFID system for managing articles according to the invention.

FIG. 5 shows an embodiment of the REID system of the invention, showing an example in which the case 30 of the invention is directly connected to the RFID reader/writer 20 via the coaxial connector 32 and the coaxial cable 38, and an example in which communication is made between the intermediary plane antennas 44 on the sides of the stacked multiple cases 30 and the transmitting-receiving antenna 24 of the REID reader/writer 20. Power is supplied from the REID reader/writer 20 and data is read or written between the REID reader/writer 20 and the IC chips 12 of the REID tags 10, as shown in FIG. 2.

Through the built-in antenna 34 and the RFID reader/writer 20, the article information stored in the storage section 18 (see FIG. 2) of the IC chip 12 in the case 30 is processed by a general computer 50 or is stored as database information in a storage unit 60. Specifically, article information stored in the IC chip 12 includes at least article identifying information (ID). The identifying information is read by the RFID reader/writer 20 and sent to the computer 50 via a communication line or a network (not shown) or directly. In this case, it is also advantageous to operate the computer 50 so as to access the RFID tags of a plurality of articles enclosed in a plurality of the cases 30. When the RFID reader/writer has the function of a personal computer (PC), simultaneous accesses to the RFID tags can be made with the PC function. The computer 50, which is connected to the storage unit 60, compares the identifying information sent form the RFID reader/writer 20 to the information in the storage unit 60, and executes processes such as outputting or updating information related to the input identifying information, such as an article name. The IC chip 12 can include concrete information such as the date of manufacture of articles, the manufacturer, and the price in addition to the identifying information. The computer and the storage unit can be either different units as a server system and a storage system or a personal computer including both of them. The RFID reader/writer 20 can be of an intelligent type having the function of a personal computer. For communication with inductive coupling type RFID tags, a loop antenna and a matching circuit can be used.

Figure 6:
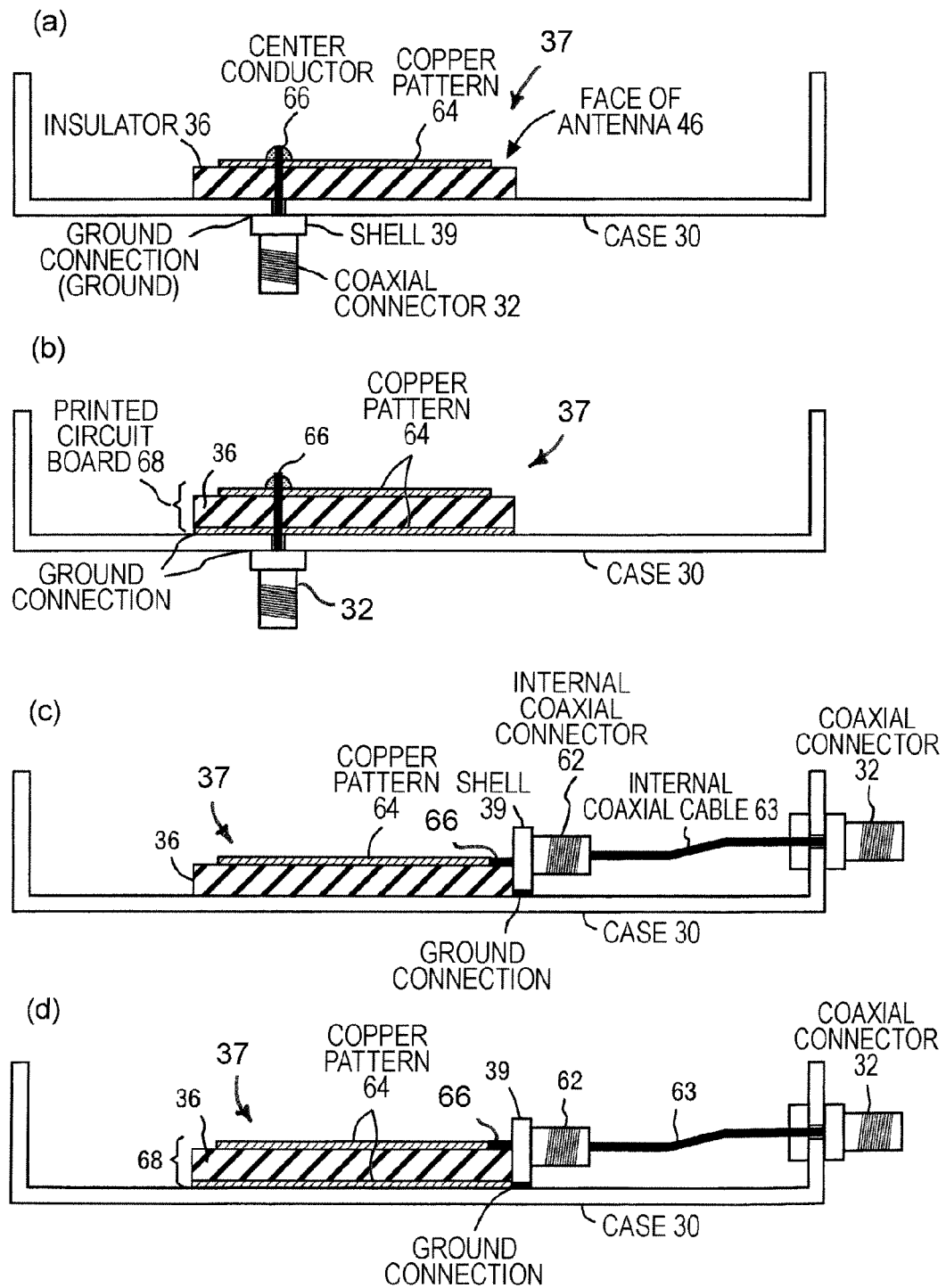

FIG. 6 shows a structural example of the built-in patch antenna (plane antenna) 34 and the external coaxial connector 32 of the article case 30 (here, a metal case) that can be used in the invention. A copper pattern 64 on an insulator 36, which constitutes the antenna face 46 of the patch antennas 37 (see FIG. 7), and the center conductor 66 of the coaxial connector 32 are generally connected together.

In the examples of FIGS. 6(a) and 6(b), the external coaxial connector 32 is directly mounted to the upper surface (or the lower surface) of the case 30. FIG. 6(a) shows an example in which the metal case constitutes the conductor face of the patch antenna 37 and the coaxial connector 32 is connected at right angles to the antenna face. FIG. 6(b) shows an example in which patch antennas 37 are formed on a double-sided printed circuit board, and the coaxial connector 32 is connected at right angles to the antenna faces.

In the examples of FIGS. 6(c) and 6(d), an internal coaxial connector 62 is connected to the copper pattern 64 of the patch antenna 37 in the case 30, and the internal coaxial connector 62 is connected to the external coaxial connector 32 or the intermediary plane antenna 44 (not shown) mounted to the outer surface of the side of the case 30 via an internal coaxial cable 63. In this case, the copper pattern(s) 64 (including the patch antenna(s) 37) on the insulator 36 is connected to the coaxial center conductor 66. FIG. 6(c) shows an example in which the metal case 30 constitutes the conductive surface of the patch antenna, and the patch antenna is connected to the external coaxial connector 32 parallel to the face of the antenna via an internal coaxial connector 62. FIG. 6(d) shows an example in which patch antennas are formed on a double-sided printed circuit board 68, and are connected to the external coaxial connector 32 parallel to the face of the antennas via the internal coaxial connector 62.

In the examples of FIGS. 6(a) and 6(c), to form a power line, the outer frame of the metal case 30 is substituted for the grounding conductor surface (grounding conductor) on the back of the patch antenna, and the patch antenna 37 is in contact with the outer frame of the metal case 30 via the shell 39 of the internal coaxial connector 62 for grounding connection. The insulator 36 and the copper pattern 64 on the insulator 36 can be formed on a one-side printed circuit board. In contrast, in the examples of FIGS. 6(b) and 6(d), a patch antenna is formed on the upper surface of the double-sided printed circuit board 68 (a substrate having copper plane on both sides with the insulator 36 therebetween), over the back of which a conductor face serving as a grounding conductor face is formed in copper pattern. The conductor face on the back of the printed circuit board and the shell of the coaxial connector are generally grounded to the outer frame of the metal case.

Figure 7:
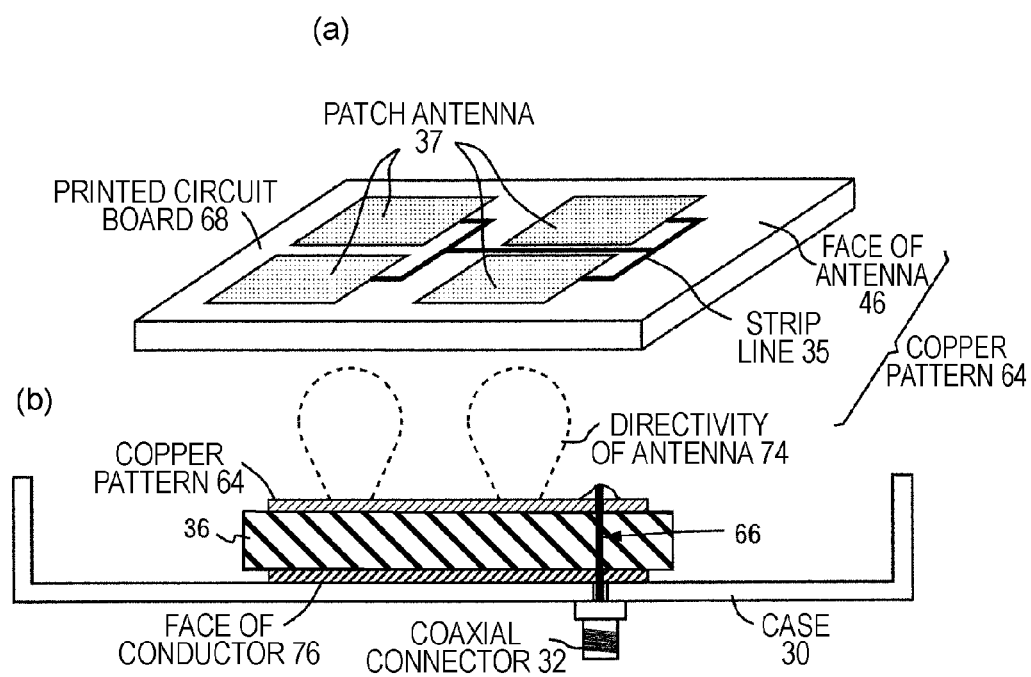

FIG. 7 shows an example of a plane patch antenna that can be used in the invention. The patch antenna is also referred to as a microstrip antenna, which has a narrow band and wide directivity. The antenna face 46 having an antenna element is formed by etching a copper layer on the printed circuit board 68. In arranging a plurality of the patch antennas 37, the patch antennas 37 are generally connected together with a strip line 35 (generally referred to as a microstrip line). The patch antennas 37 can be connected together with a coaxial connector and a coaxial cable. The (micro)strip line corresponds to the center conductor of the coaxial cable, and the grounding conductor face (grounding conductor) underlying the insulator corresponds to the braided wire of the coaxial cable. The plurality of (in FIG. 7, four) patch antennas 37 faces the antennas of the RFID tags, with the case 30 of the invention (see FIG. 3) closed, for transmitting or receiving radio waves. As shown in FIG. 7, general patch antennas have an antenna face 46 including the plurality of patch antennas 37 and the strip line 35 which are formed in the copper pattern 64 on the insulator 36, and further have a grounding conductor face 76 (generally solid copper plane, also referred to as a grounding conductor) grounded to the lower surface of the insulator 36. The microstrip line 35 of the antenna face 46 and the solid grounding conductor face 76 underlying the insulator 36 constitutes a power transmission line. The center conductor 66 of the coaxial connector 32 and the copper pattern 64 including an antenna element are soldered together. The antenna face 46 of the patch antennas 37 has directivity 74 as illustrated, and is opposed to the antennas of the RFID tags attached to the articles. Having described an arrangement for a rectangular patch antenna for vertically polarized waves, modifications can be made such as a circular patch antenna for circular polarized waves or a chamfered rectangular antenna, and furthermore, changing the feeding point of the antennas allows provision for vertically polarized waves, horizontally polarized waves, and left-handed or right-handed radio waves.

Figure 8:
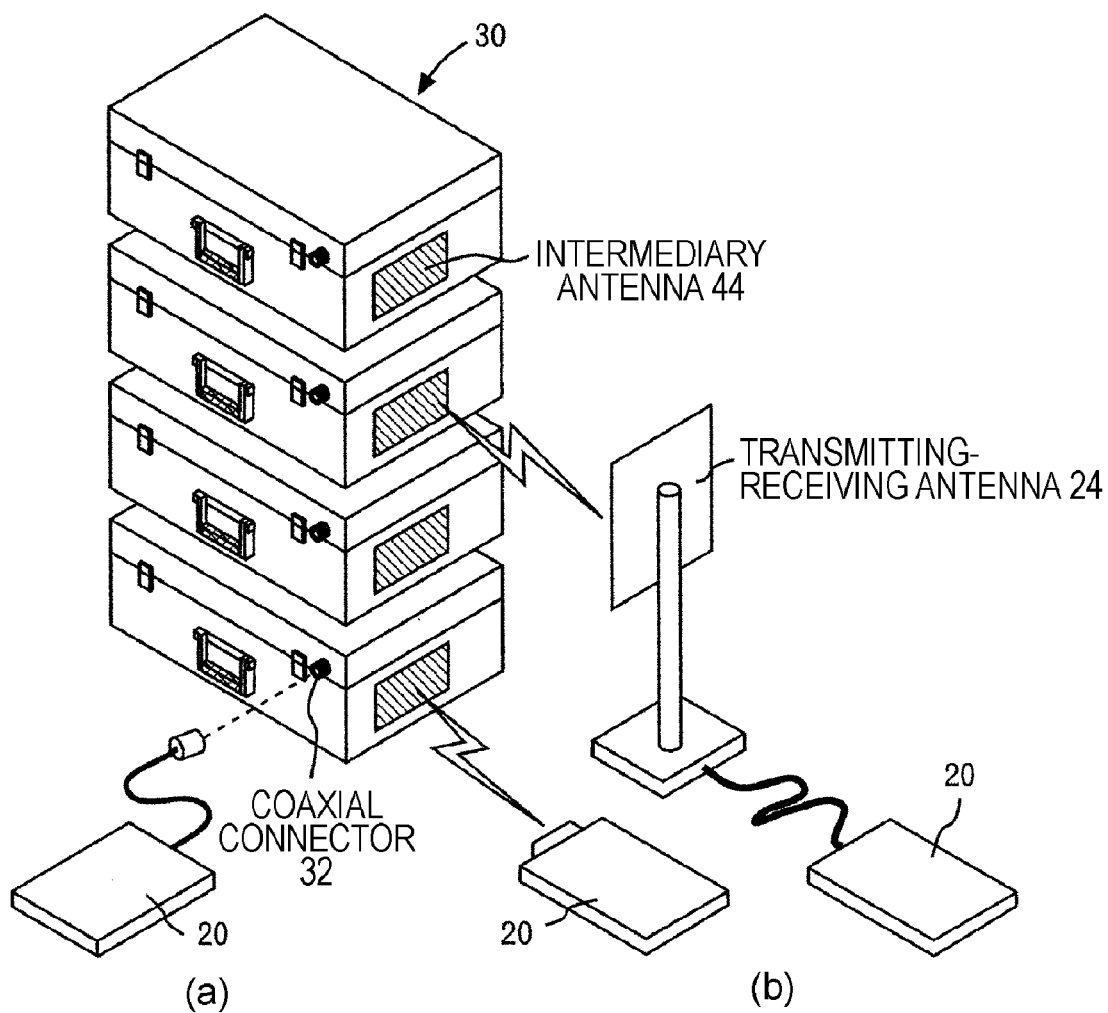
FIG. 8 shows an example of identification of RFID tags in a plurality of cases for (a) a coaxial connector and (b) an intermediary antenna.

FIG. 8 shows an example of identifying RFID tags with a plurality of the cases 30 of the invention stacked. This is an embodiment for accessing article information without opening the case. As shown in FIG. 3, the case 30 accommodates a plurality of articles (not shown, e.g., containers that contain magnetic tape or valuables) to which RFID tags are attached.

FIG. 8(a) shows an arrangement in which a coaxial cable (an input/output cable) from the RFID reader/writer 20 is connected to the coaxial connector 32 on the outer surface of the case 30, the external coaxial connector 32 being connected to the built-in antenna 34 (not shown) in the case 30. In this case, the built-in antenna 34 serves as the transmitting-receiving antenna of the RFID reader/writer 20. Thus the read/write mechanism connected to the built-in antenna 34 allows an access to the RFID tags without opening the case 30. In carrying the multiple cases 30 in or out in stacked state, as illustrated, there is no need to open the cases 30 one by one to read the RFID tags; it is enough to reconnect the cable from the RFID reader/writer 20 to the respective coaxial connectors 32. This is advantageous in terms of security.

FIG. 8(b) shows an example in which the RFID reader/writer 20 is not connected to the built-in antenna 34 of the case 30 but the patch antenna, that is, the intermediary plane antenna 44 is used, the intermediary antenna 44 being connected to the built-in antenna 34 of the case 30 and placed on the outer surface of the case 30. Appropriately opposing the transmitting-receiving antenna 24 of the RFID reader/writer 20 to the intermediary antenna 44 allows the RFID tags to be read without opening the case 30. In this case, the RFID reader/writer 20 has either a transmitting antenna and a receiving antenna separate from each other or a transmitting-receiving antenna. General stationary RFID reader/writers can access the respective patch antennas of multiple cases, as illustrated, in sequence to access the information of the RFID tags in the cases. Another arrangement (not shown) is possible in which the transmitting-receiving antenna 24 connected to the RFID reader/writer 20 and the intermediary antenna 44 (not shown) separate from the case connected to the external coaxial connector 32 communicate with each other. Yet another method is possible in which a plurality of RFID tags in multiple cases can be accessed without opening the case 30 through a U-shaped gate of a gate-type RFID reader/writer equipped with a transmitting-receiving antenna.

FIG. 9 is a flowchart of a method for managing articles using the RFID system of the invention. The RFID system of the invention can be applied to any articles but particularly advantageous in managing articles, such as noble metal, in a case without opening the case in terms of security. First, a RFID reader/writer is prepared (S101), and an RFID tag adapted to the frequency band of a radio wave for use in communication is prepared (S102). The RFID reader/writer includes a transmitting-receiving antenna and a controller connected to the transmitting-receiving antenna and having a read/write mechanism. A case having the built-in antenna of the invention is prepared (S103). The case includes a built-in antenna opposed to the antenna of the RFID tag attached to an article and a coaxial connector connected to the built-in antenna or an intermediary plane antenna (patch antenna) on the outer surface of the case. Alternatively, a separate intermediary antenna that can be connected to the external coaxial connector of the case can be prepared (S104). Peripheral devices such as a computer and a storage unit are prepared as necessary.

The RFID tag prepared in S102 is attached to an article (S105). The RFID tag can be either attached to the surface of the article or connected to the article with a strap or the like, or embedded in the article according to circumstances. If the RFID tag cannot be directly attached to an article, the article can be attached to a container of the article. The IC chip of the RFID tag prepared in S102 can either have stored information such as article identifying information or not. The article information can include any information other than the identifying information. The article with the RFID tag is disposed in the case with the face of the RFID tag opposed to the antenna face of the built-in antenna in the case, and then the case is closed (S106).

In general, the method for managing articles according to the invention is started after an RFID tag has been prepared (S102), attached to an article (S105), and the article has been stored in the case of the invention, and then closed (S106). Here a plurality of the cases can be prepared and stacked.

In managing articles, when the coaxial connector on the outer surface of the case connected to the built-in antenna in the case which is closed in S106 is used (S107), the following two different steps are possible. That is, the read/write mechanism of the RFID reader/writer is directly connected to the coaxial connector with a coaxial cable (S109), thereby enabling the communication between the read/write mechanism of the RFID reader/writer and the built-in antenna (S111). Alternatively, an intermediary antenna separate from the case prepared in S104 is connected to the coaxial connector (S110), and the transmitting-receiving antenna of the RFID reader/writer is brought close to the intermediary antenna to enable communication with the read/write mechanism (S112).

When the intermediary patch antenna on the outer surface of the case connected to the built-in antenna is used (S108), the transmitting-receiving antenna of the RFID reader/writer can be brought close to the intermediary antenna (in this case, the case because the intermediary patch antenna is provided on the outer surface of the case) to enable communication with the read/write mechanism (S112). Alternatively, in S112, either the case can be moved toward an RFID reader/writer disposed in position, e.g., a stationary or gate-type RFID reader/writer or the RFID reader/writer itself can be moved toward the case. The RFID reader/writer generates radio waves at the antenna when electric current is supplied from the read/write mechanism serving as a controller.

When the intermediary antenna and the RFID reader/writer come close in an appropriate arrangement, the radio wave generated at the antenna of the RFID reader/writer propagates to the built-in antenna in the case via the intermediary antenna, through which the antenna of the RFID tag generates electric current by resonance to supply the electric current, that is, power to the controller of the IC chip, thereby enabling communication between the read/write mechanism of the RFID reader/writer and the IC chip (S112). When communication is enabled, transfer of information between the RFID reader/writer and the IC chip can be made, and as such, article information in the IC chip of the RFID tag can be read or information can be written to the IC chip (S113). The read information is input to a computer connected to the RFID reader/writer via the RFID reader/writer and is processed by the computer. Since the process can be a general process by computers, which allows information processing by the system as shown in FIG. 5, a detailed description will be omitted here.

The article case of the invention is lightweight and has high portability because it contains only a built-in antenna serving as a transmitting-receiving antenna and RFID tags and has no RFID reader/writer and no power supply. This is particularly suitable for a solid metal case for magnetic tape or other valuables with an RFID tag. The case of the invention is also suitable for a case made of a material with high electromagnetic attenuation or a case whose outer frame is so thick that little electromagnetic wave is transmitted. The method for managing articles according to the invention can be applied to inventory management and delivery management which require high security and thus need to handle the articles in the case without opening the case. Note that the size and shape of the case are not limited.

Although the invention has been described in its various embodiments with reference to the drawings, the technical scope of the invention is not limited to that of the embodiments. It is to be understood by those skilled in the art that the embodiments can be variously changed and modified. Accordingly, it should be understood that various changes and modifications are included in the technical scope of the invention.

What is claimed is:

1. A portable metal article case for carrier for accessing information enclosed in the case, comprising:
    a magnetic tape article housed within the case, wherein the case is fully enclosed;
    a radio frequency identification (RFID) tag attached to the magnetic tape article, wherein the RFID tag includes a RFID antenna and an integrated circuit chip, wherein the integrated circuit chip includes a date of manufacture for the article, a manufacturer of the article, and a price for the article;
    a built-in antenna disposed on a case inner surface that communicates with the RFID tag attached to the article
    at least one patch antenna connected to an antenna surface of the built-in antenna wherein the patch antenna is positioned facing the RFID antenna of the respective RFID tag; and
    a communication structure disposed on a chassis exterior frame surface of the case that is connected through the case interior surface to the built-in antenna wherein the communication structure is operable to communicate with an external RFID reader/writer that is separate from the case, wherein
    the built-in antenna is directly mounted onto the case inner surface via an insulator; and the chassis exterior frame surface of the case is connected to the patch antenna operable to form a ground plane.

2. The article case according to claim 1, wherein the communication structure comprises a chassis exterior frame surface coaxial connector.

3. The article case according to claim 1, wherein the communication structure comprises an intermediary transmitting-receiving patch antenna.

4. The article eases case according to claim 1, wherein
    the built-in antenna comprises a ground plane side on the antenna surface and an opposite side of the built-in antenna comprises the insulator; and
    the antenna surface comprises a plurality of patch antennas and a strip line connecting between respective patch antennas.

5. The article case according to claim 2, wherein the built-in antenna functions as a transmitting-receiving antenna of the external RFID reader/writer.

6. The case according to claim 2, further comprising an internal coaxial connector connected to the built-in antenna, wherein the internal coaxial connector and the chassis exterior frame surface coaxial connector are connected via a coaxial cable; and the external surface coaxial connector is mounted onto the surface of the case adjacent and parallel to the antenna surface of the built-in antenna.

7. A radio frequency identification (RFID) system, comprising:
    at least one portable metal article case containing a magnetic tape article and an RFID tag attached to the article enclosed in the case;
    a built-in antenna connected within the case wherein the built-in antenna is operable to communicate with the RFID tag attached to the article and wherein the built-in antenna includes at least one patch antenna, and wherein the built-in antenna further includes an antenna surface positioned to face an RFID tag antenna of the RFID tag;
    a communication structure connected through the case to the built-in antenna and disposed on an outer surface of the case;
    an external RFID reader/writer comprising a read/write mechanism and a transmitting-receiving antenna, the RFID reader/writer being connected to the communication structure to access the RFID tag;
    an information storage unit storing information related to the article; and
    a computer in operable connection to the external RFID reader/writer operable to identify information received by the external RFID reader/writer, wherein
    the RFID reader/writer accesses information of the article without opening the case;
    the built-in antenna is directly mounted onto an inner surface of the metal case via an insulator; and
    a chassis external frame comprises a grounding conductor side of the patch antenna in the built-in antenna.

8. The RFID system according to claim 7, wherein the communication structure comprises an external coaxial connector, an intermediary transmitting-receiving patch antenna or a combination thereof.

9. The RFID system according to claim 7, wherein the read/write mechanism of the RFID reader/writer is directly connected to the external coaxial connector via a coaxial cable.

10. The RFID system according to claim 8, further comprising an intermediary transmitting-receiving antenna separate from the case, the intermediary transmitting-receiving antenna being connected to the external coaxial connector.

11. The RFID system according to claim 10, wherein the separate intermediary transmitting-receiving antenna comprises at least one of groups of patch antennas, horn antennas and parabolic antennas.

12. A method for managing an article, comprising:
    setting a portable metal case within radio communication of an external antenna wherein the case includes a built-in antenna for communicating with an radio frequency identification (RFID) tag attached to an article enclosed within the case, wherein the case includes an external surface coaxial connector or an intermediary patch antenna connected to the built-in antenna wherein the external surface coaxial connector or the intermediary patch antenna is disposed on an outer surface of the case, and wherein the built-in antenna includes at least one patch antenna;
    disposing a surface of the article to which the RFID tag is attached in a direction opposed to the patch antenna;
    positioning an RFID reader/writer separated from the case for accessing the RFID tag, wherein the RFID reader/writer includes the external antenna;
    connecting the RFID reader/writer to the external coaxial connector of the case with a coaxial cable or bringing the external antenna of the RFID reader/writer close to the intermediary patch antenna, with the external antenna of the RFID reader/writer positioned in opposition to the intermediary patch antenna, thereby enabling communication;
    causing the built-in antenna to generate radio waves via the coaxial cable or the intermediary patch antenna to resonate an antenna of the RFID tag with the radio waves such that the RFID reader/writer accesses the RFID tag attached to the article, wherein
the RFID reader/writer accesses the article information from the outside of the case without opening the case;
the built-in antenna is directly mounted to an inner surface of the case via an insulator; and
a chassis exterior frame of the case comprises grounding conductor side of the patch antenna
transmitting the article information to an information storage unit for processing.

13. The method according to claim 12, further comprising:
connecting an intermediary antenna separate from the case to the external coaxial connector, and bringing the antenna of the RFID reader/writer close to the intermediary antenna, with the antenna of the RFID reader/writer opposed to the intermediary antenna, thereby enabling communication.

* * * * *